United States Patent
Premchandran et al.

(10) Patent No.: US 7,571,393 B2
(45) Date of Patent: Aug. 4, 2009

(54) METHOD FOR NAVIGATION BETWEEN ELEMENTS ON A PAGE OF CONTENT IN A HANDHELD DEVICE

(75) Inventors: Girish Premchandran, Redmond, WA (US); Vishal Thakkar, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1207 days.

(21) Appl. No.: 10/413,367

(22) Filed: Apr. 15, 2003

(65) Prior Publication Data

US 2004/0210851 A1 Oct. 21, 2004

(51) Int. Cl.
G06F 3/00 (2006.01)
(52) U.S. Cl. .................. 715/767; 715/738; 715/819; 715/834; 715/864; 715/860
(58) Field of Classification Search ............ 715/767, 715/857, 854, 738, 817
See application file for complete search history.

(56) References Cited

U.S. PATENT DOCUMENTS

| | | | | |
|---|---|---|---|---|
| 6,034,689 A * | 3/2000 | White et al. | ........... | 715/854 |
| 6,154,205 A * | 11/2000 | Carroll et al. | ........... | 345/684 |
| 6,614,445 B1 * | 9/2003 | Dorbie | ........... | 345/582 |
| 6,678,891 B1 * | 1/2004 | Wilcox et al. | ........... | 725/42 |
| 6,812,940 B2 * | 11/2004 | Arnold | ........... | 715/817 |
| 6,825,860 B1 * | 11/2004 | Hu et al. | ........... | 715/801 |
| 7,197,717 B2 * | 3/2007 | Anderson et al. | ........... | 715/767 |
| 2001/0017634 A1 * | 8/2001 | Scott | ........... | 345/767 |
| 2004/0001105 A1 * | 1/2004 | Chew et al. | ........... | 345/817 |

FOREIGN PATENT DOCUMENTS

WO    WO 02/052395 A2    7/2002

OTHER PUBLICATIONS

M. Sharples et al., "The Design and Implementation of a Mobile Learning Resource," *Personal and Ubiquitous Computer*, (2002) 6:220-234.
G. Furnas, "Effective View Navigation," *Proceedings CHI '97* (Atlanta GA, Mar. 1997), ACM Press.
Y. Guiard et al., "Navigation as Multiscale Pointing: Extending Fitts' Model to Very High Precision Tasks," *Proceedings CHI '99* (Pittsburgh PA, May 1999), ACM Press, pp. 450-457.
K. Hinckley et al., The VideoMouse: A Camara-Based Multi-Degree-of-Freedom Input Device, *UIST '99* (Asheville NC, 1999), *CHI Letters*, vol. 1, 1, pp. 103-112.
M. Raghunath et al., "User Interfaces for Applications on a Wrist Watch," *Personal and Ubiquitous Computing*, (2002) 6:17-30.

* cited by examiner

*Primary Examiner*—Stephen S Hong
*Assistant Examiner*—Ryan F Pitaro
(74) *Attorney, Agent, or Firm*—Birch, Stewart, Kolasch & Birch, LLP (57) ABSTRACT

A method for navigating between elements on a page of content using an input in a handheld device. The method includes receiving an input corresponding to a navigation direction, determining an element that is radially closest to a current focus element in the navigation direction, and setting the element as the next current focus element. The input may be received from a four-way directional pad associated with the handheld device.

28 Claims, 7 Drawing Sheets

METHOD FOR NAVIGATION BETWEEN ELEMENTS ON A PAGE OF CONTENT IN A HANDHELD DEVICE

FIELD OF THE INVENTION

The present invention generally relates to systems and methods for navigating among selectable objects or elements on a display of a handheld device. Such systems and methods, at least in some examples of the invention, may be used in connection with a mobile phone or personal digital assistant.

BACKGROUND

Handheld computing devices have become ubiquitous. Users now surf the Internet and access web pages using such devices. Typically, a web page includes content having many elements between which a user can navigate. A user can see a substantial portion, if not all of a web page, including multiple objects or elements of that page on the display of a conventional PC or laptop computer and navigate to those elements using a control device such as a mouse, trackball, keyboard arrow keys, or touch pad. Certain of these devices allow a user to navigate in any direction on the screen.

Handheld devices such as the Smartphone by Microsoft Corporation of Redmond, Wash. are equipped with web surfing capability. The Smartphone is a mobile phone that has many features including a web browser, Pocket Internet Explorer, which allows a user to surf the World Wide Web. However, some handheld devices such as Smartphone do not have a touch screen or mouse to navigate between elements of a web page. Rather, to navigate between elements of a web page accessed using Pocket Internet Explorer, the Smartphone provides a four-way directional pad (d-pad). The four-way d-pad navigation behavior resembles the behavior of the left, right, up and down arrow keys associated with a conventional keyboard. An entire web page of content is generally too large to display on the display screen of the Smartphone or other handheld devices. Thus, moving between elements in the web browser using the four-way d-pad can be confusing and inefficient.

Figure 1:
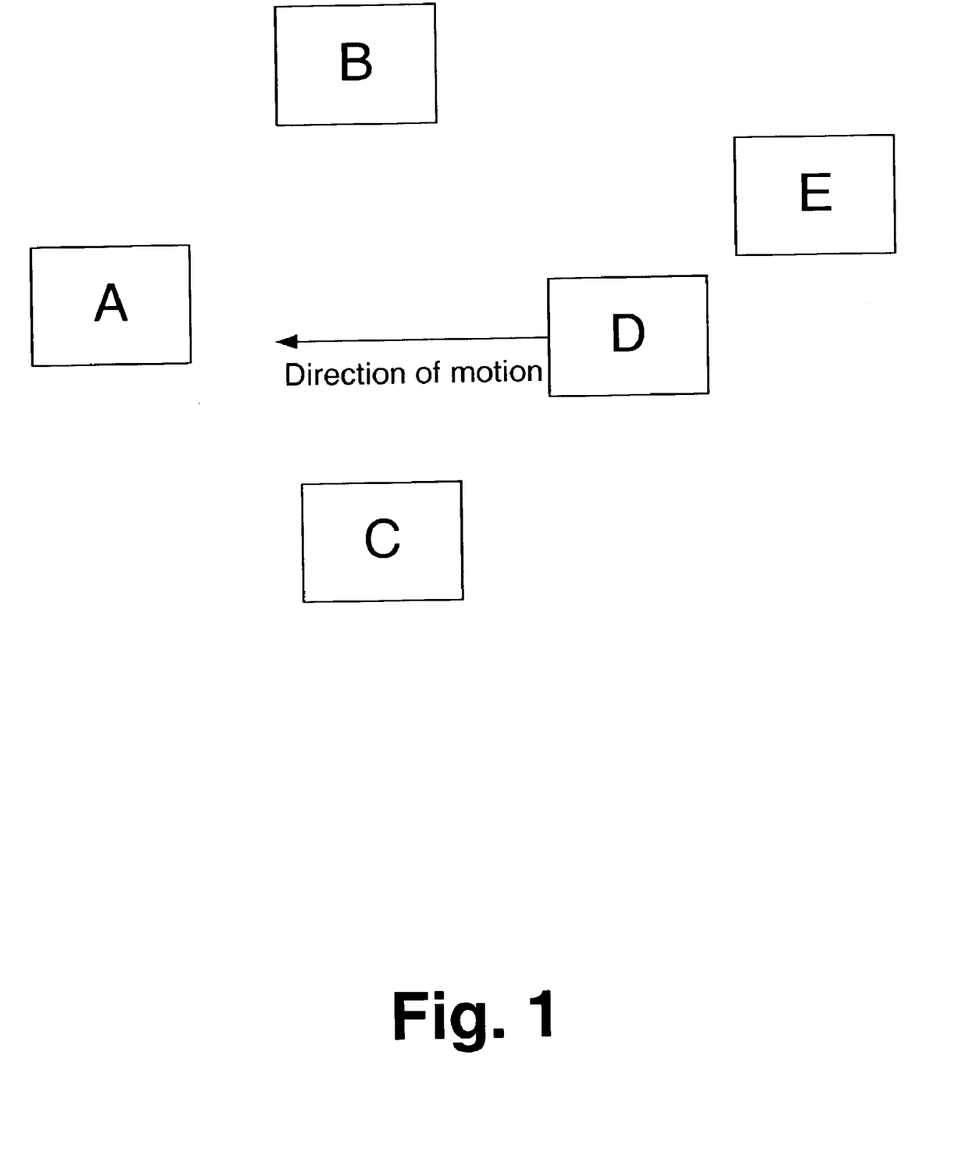
FIG. 1 shows an illustrative layout of elements on a web page.

To illustrate the possible confusion and inefficiency, an exemplary HTML page is shown in FIG. 1. The HTML page includes five elements A, B, C, D, and E. Assume the user has selected element D and now desires to move to the left. According to the current algorithm used with the Smartphone d-pad, if a user moves to the left, she would expect to go to element C. However, the user instead goes to element A. This results because the algorithm first determines which elements are valid to move to responsive to the left movement. In the example, in FIG. 1, elements A, B, and C are all candidates because they fall within the direction of motion. This is, these elements are some distance in the left horizontal direction away from element D. Element A gets priority over both element C, the desired element for the user, and element B because the algorithm determines which of the candidate elements is vertically closer to the direction of motion. That is, element A is vertically closer to a horizontal line in the direction of motion intersecting element D.

Thus, the algorithm for navigating left and right between elements in the Smartphone with the d-pad acts as follows: 1) a list of candidate elements which can be navigated to in response to the direction of motion is identified; and 2) then the candidate element that is closest vertically to a horizontal line in the direction of motion is navigated to. The algorithm when applied to up and down navigation between elements acts similarly. Specifically, 1) a list of candidate elements, which can be navigated to in response to the direction of motion, is identified; and 2) the candidate element that is closest horizontally to a vertical line in the direction of motion is navigated to.

Referring to the example discussed with respect to FIG. 1, intuitively, the user might think that a movement to the left from element D would result in direct navigation to element C. Instead, according to the current algorithm to navigate to element C, the user would first have to navigate to element A as described and then input a down navigation command to the d-pad to reach element C requiring two steps. Further adding to the confusion, it is possible that the portion of the page of content displayed on the display screen to the user when she enters the left navigation command may include element C, but not include element A. Nonetheless, responsive to the left navigation command, the system will navigate to element A because it is the closest element vertically to element D in the left direction.

Thus, with handheld devices such as Smartphone, there is a need to make navigating between elements, for example on a web page, intuitive to a user and more efficient.

SUMMARY

Aspects of the present invention relate to methods for navigating between elements on a page of content responsive to a navigation command input to a computing device, such as a handheld mobile phone. Some aspects of the invention include a method or algorithm for determining an element to navigate to relative to another element (a current focus element) based on a user input. In one aspect, the algorithm uses the radial distance between a current focus element and other elements as a parameter to decide which element a user desires to navigate to in response to a user input.

In another aspect of the present invention, the method includes receiving an input corresponding to a navigation direction, determining an element that is radially closest to a current focus element in the navigation direction, and setting the element as the next current focus element. In a further aspect, the input may be received from a four-way directional pad associated with a handheld computing device.

In yet another aspect of the present invention, when plural elements are radially closest to the current focus element, the method determines which element of the plural elements is closest to a line intersecting the current focus element in the navigation direction.

According to an aspect of the invention, depending upon a navigation command entered by the user, the method attempts to determine which element a user desires to navigate to. In a further aspect, the method determines whether any elements are located in a navigation region corresponding to the navigation direction. In this aspect, if at least one element is located in the navigation region corresponding to the navigation direction, the method can identify an element that is radially closest to a midpoint of a current focus element in the navigation direction, and set the element identified as radially closest to the midpoint of the current focus element as the next current focus element. If no elements are located in the navigation region corresponding to the navigation direction, the current focus element does not change.

In a still further aspect of the present invention, the navigation region is bounded by a line intersecting the midpoint of the current focus element and perpendicular to the navigation direction, and second and third lines parallel to the navigation direction and spaced from a line intersecting the midpoint of the current focus element in the navigation direction.

In yet another aspect of the present invention, the page of content is a web page from a browser application. In still another aspect of the present invention, the page of content can be from a word processing application or an email application.

Benefits realized by one or more aspects include providing a better user experience and reducing the number of inputs needed to navigate to a desired element.

These and other novel advantages, details, embodiments, features and aspects of the present invention will be apparent to those skilled in the art from following the detailed description of the invention, the attached claims and accompanying drawings, listed herein, which are useful in explaining the invention.

BRIEF DESCRIPTION OF THE DRAWINGS

The foregoing summary, as well as the following detailed description of illustrative embodiments, is better understood when read in conjunction with the accompanying drawings, which are included by way of example, and not by way of limitation with regard to the claimed invention.

DETAILED DESCRIPTION

As described above, aspects of the present invention relate to a method that allows for navigation between elements displayed on a page of content. The method is particularly applicable to handheld computing devices, but may be applied to other computing devices as appropriate. The page of content may be part of any application having elements operational on the computing devices, including, but not limited to, email programs, scheduling programs, PIM (personal information management) programs, word processing programs, spreadsheet programs, and Internet browser programs. An "element" as used in this application encompasses any specific content on a page with which a user may interact and may be referred to as a selectable object. That is, upon navigation to that element, a user may "select" that element causing an action to occur. Examples of an element include, among others, HTML content, buttons, images, embedded documents, text boxes, hyperlinks, and the like. The method may be referred to herein as an algorithm. The algorithm can be part of the navigation functionality associated with an individual application, such as a web browser application, a word processing application or any other application that involves navigation. Alternatively, the algorithm may be part of the operating system and apply to multiple applications that involve navigation.

Figure 2:
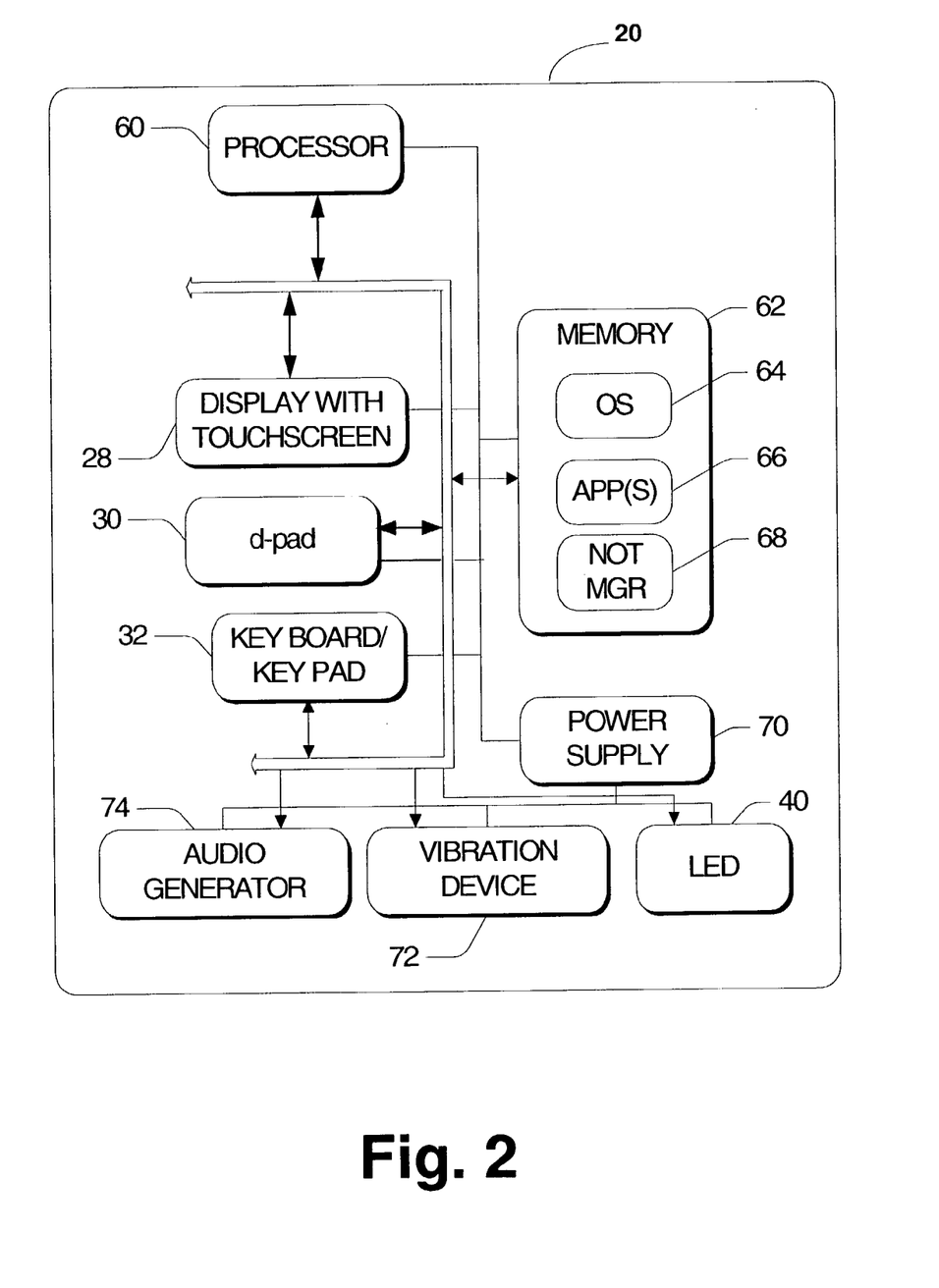
FIG. 2 shows an illustrative block diagram including elements of an exemplary handheld device operating environment to which a method of the present invention may be applied.

FIG. 2 illustrates an example of a handheld operating environment 20 in which the invention may be implemented. The operating environment 20 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, or laptop devices, multiprocessor systems, microprocessor-based systems, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments. Handheld computing device 20 typically includes at least some form of computer readable media. Computer readable media can be any available media that can be accessed by handheld computing device 20. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by handheld computing device 20. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

FIG. 2 shows functional components of an exemplary handheld computing device 20. It has a processor 60, a memory 62, a display 28, a directional pad (d-pad) 30 and a keyboard/keypad 32. The memory 62 generally includes both volatile memory (e.g., RAM) and non-volatile memory (e.g., ROM, PCMCIA cards, etc.). An operating system 64 is resident in the memory 62 and executes on the processor 60. The handheld computing device 20 includes an operating system, such as the Windows® CE operating system from Microsoft Corporation or another operating system.

One or more application programs 66 are loaded into memory 62 and run on the operating system 64. Examples of applications include email programs, scheduling programs, PIM (personal information management) programs, word processing programs, spreadsheet programs, Internet browser programs such as Microsoft Pocket Internet Explorer, and so forth. The handheld computing device 20 also has a notification manager 68 loaded in memory 62, which executes on the processor 60. The notification manager 68 handles notification requests from the applications 66.

The handheld computing device 20 has a power supply 70, which is implemented as one or more batteries. The power supply 70 might further include an external power source that overrides or recharges the built-in batteries, such as an AC adapter or a powered docking cradle.

The handheld computing device 20 is also shown with three types of external notification mechanisms: an LED 40, a vibration device 72, and an audio generator 74. These devices can be directly coupled to the power supply 70 so that when activated, they remain on for a duration dictated by the notification mechanism even though the handheld computing device processor 60 and other components might shut down to conserve battery power. The LED 40 can remain on indefinitely until the user takes action. The current versions of the vibration device 72 and audio generator 74 may use too much power for today's handheld computing device batteries, and so they can be configured to turn off when the rest of the system shuts off or at some finite duration after activation.

It will be appreciated by those skilled in the art that the handheld computing device may include other known input and output elements in addition to those described above.

Figure 3:
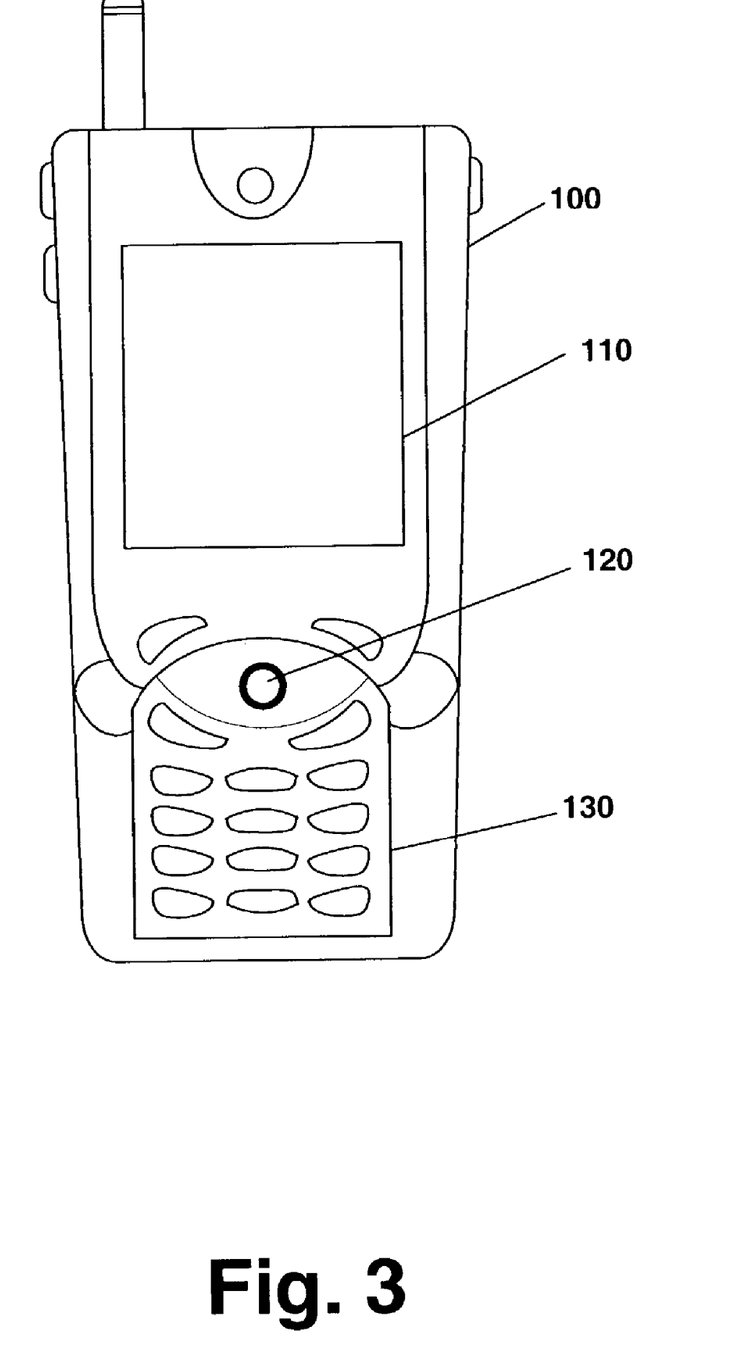
FIG. 3 shows an illustrative handheld computing device, a Smartphone, to which a method of the present invention may be applied.

An illustrative handheld computing device according to the present invention is a Smartphone by Microsoft Corporation of Redmond, Wash. It will be appreciated that the handheld computing device would include an audio input, a wireless transceiver and a wireless modem connected with the other elements of the device in a manner similar to the other inputs (e.g., keypad). The Microsoft Windows® Powered Smartphone provides all the basic and advanced mobile phone functions. In addition, the Smartphone offers full personal information management and e-mail functionality through Outlook®, a Web browser in Pocket Internet Explorer, instant message capabilities with MSN® Messenger, and the ability to listen to music and play video with Windows Media® Player. FIG. 3 shows an exemplary Smartphone 100 with a display screen 110, a four-way directional pad (d-pad) 120 and keypad 130. Navigation through a page of content on the Smartphone can be accomplished using the d-pad 120. The d-pad 120 is configured to receive navigation commands in four directions, up, down, left and right and a select command. In an illustrative implementation, a d-pad can function as a joystick in that the d-pad receives a select command when pressed downward and an individual directional navigation command when pressed laterally, in the right, left, up or down directions.

While the Smartphone uses a four-way d-pad, the present invention is not so limited. A d-pad with more or less than four degrees of freedom could be used with the present invention. A four-way d-pad is chosen for Smartphone due to its ease of use and understanding to the user. In resembling the right, left, up and down arrow keys on a regular keyboard, the behavior of a navigation input to the d-pad can be clearly comprehended by a user. From a practical standpoint, the maximum number of degrees of freedom for a d-pad can be a function of the size of the d-pad itself. Specifically, a user should be able to manipulate the d-pad in each direction with limited confusion. Thus, it could be difficult and inefficient to have eight degrees of freedom in a small d-pad, such as found on the handheld mobile phones of today.

When a browser application is launched with the Smartphone, for example, Pocket Internet Explorer, a web page is presented to the user. Due to the size of display screen 110, a user will generally only be able to see a portion of the web page content. The Smartphone first displays the content in the top left portion of the web page as one would normally read, and the displayed element that is closest horizontally to the top left corner of the page will be assigned as the "current focus element". That is, the system finds the first displayed element to assign as the current focus element by searching on the page left to right, line by line until an element is found. If no element is displayed in the first portion of the web page content, no current focus element is assigned. In this instance, responsive to a navigation command, the user navigates to another portion of the web page, either to the right or down depending on the command. The first element assigned, as the current focus element will be the first element displayed that is closest horizontally to the top left corner of the web page. If the user desires to interact with an element that element must be the current focus element to respond to a select command. The current focus element may, but does not have to, be displayed on the display screen 110. That is, when making a select command, the user may not see the current focus element.

According to an exemplary embodiment of the present invention, to view additional content, a user inputs a navigation command through d-pad 120. In response to the navigation command, additional content, if any, adjacent to the currently displayed content on the web page in the direction of navigation may be displayed on the display screen 110. The content displayed responsive to the d-pad command may include content displayed prior to the d-pad command. In other words, the entire content may not change responsive to a navigation command; rather a portion of or even none of the content may change.

Also, after receiving the navigation command corresponding to the navigation direction, the Smartphone determines which element, if any, is radially closest to a current focus element in the navigation direction. Then, the element that is closest to the current focus element can be set as the next current focus element. A specific example will be described in connection with FIG. 4.

Figure 4:
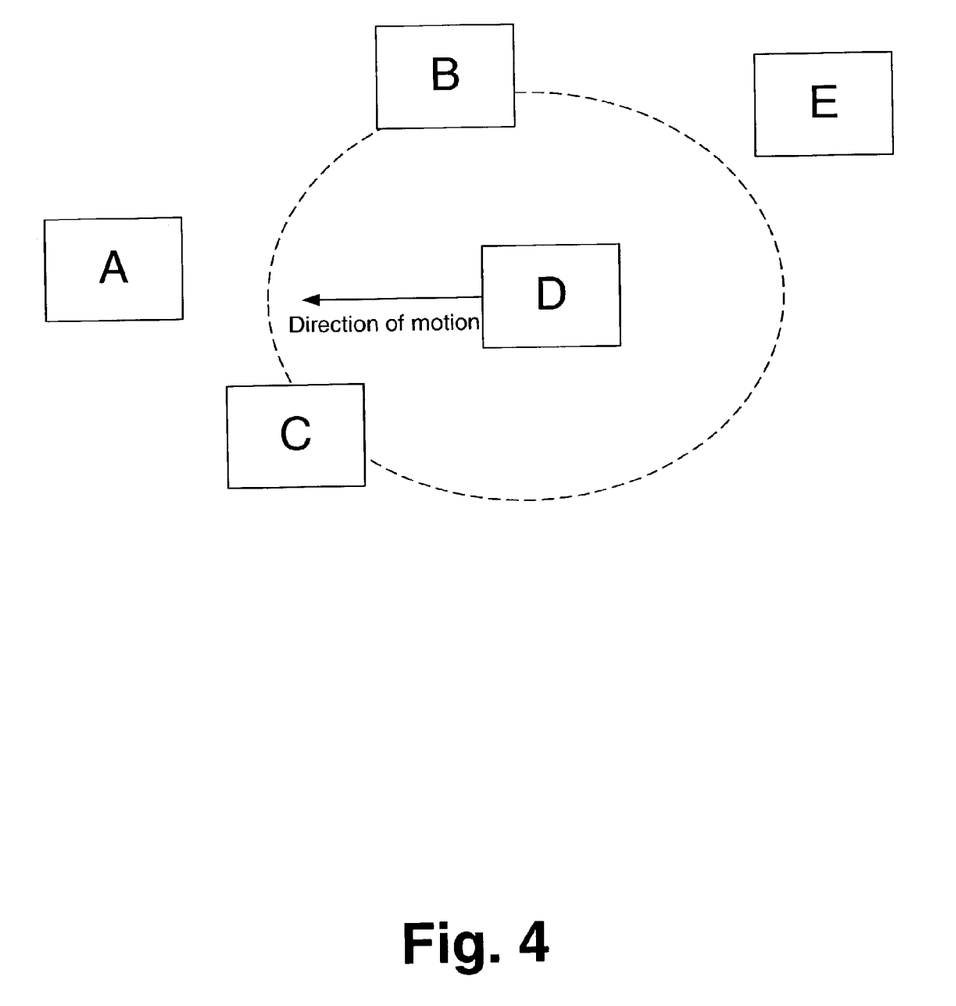
FIG. 4 shows an illustrative layout of elements on a web page used to assist in describing an exemplary implementation of the present invention.

FIG. 4 shows five elements of an illustrative web page A, B, C, D and E. Assume element D is the current focus element and the user enters a left navigation command. Then, the direction of motion or navigation is to the left. To determine which element to navigate to, namely, which element will become the next current focus element, any elements located in a navigation region corresponding to the navigation direction are identified. For the Smartphone with a four-way d-pad, the direction of the navigation encompasses the area to the left of a line perpendicular to the direction of motion intersecting the midpoint of element D. In the example of FIG. 4, elements A, B and C all fall within the navigation direction. In this implementation, the navigation region is the area on the page of content to the left of a line perpendicular to the direction of motion intersecting the midpoint of element D.

The next step is to determine which element is radially closest to element D, the current focus element. In one implementation, to determine which element is radially closest to the current focus element, the distance is measured between the midpoint of the current focus element and the midpoint of each of the candidate elements. It is within the knowledge and skill of one of ordinary skill in the art how to determine the midpoint of an element, such as an HTML element. For example, software in a browser application can include the method necessary to determine the midpoint of an element.

An element can be shaped in a number of different ways depending on the content representing the element. In one implementation, underlying an element is a series of rectangles, where the element is divided into the smallest number of non-overlapping rectangles. The midpoint of the element is then determined by finding the midpoint of the smallest rectangle including all the non-overlapping rectangles. One skilled in the art can readily determine the midpoint of the element by using such a method. For example, such a midpoint determining algorithm is a Microsoft Windows® application program interface (API).

If only one element is closest to the current focus element, then that element is set as the next current focus element. It is possible that two or more elements are radially closest to the current focus element, that is the two or more elements are radially closest to the current focus element in that the elements are radially equidistant to the current focus element. When two or more elements are radially closest to the current focus element, then the navigation algorithm determines which of the elements' midpoints is closest to a line intersecting the current focus element in the navigation direction. In one implementation, the line intersects the midpoint of the current focus element. The element determined to be closest to the line intersecting the current focus element in the navigation direction is then set as the next current focus element. In the event that midpoints of two elements are the same distance from the line intersecting the current focus element, then the element which is the most positive in terms of an x-y coordinate system is set as the next current focus element.

In FIG. 4, two elements, B and C are radially closest and equidistant to the current focus element D. The line intersecting the midpoint of element D in the navigation direction is shown as the direction of motion line. Visual inspection of FIG. 4 shows that element C is closest to the line. Thus, element C is set as the next current focus element. Assume that element B were located along the dashed circle around element D directly above element C such that each element would be radially equidistant from element D and equidistant from the direction of motion line. In this instance, element B would be set as the next current focus element because element B would be more positive in terms of the x-y coordinate system relative to element D. Specifically, both elements would be negative in the x-direction, but element B would be positive in the y-direction while element C would be negative in the y-direction.

Figure 5:
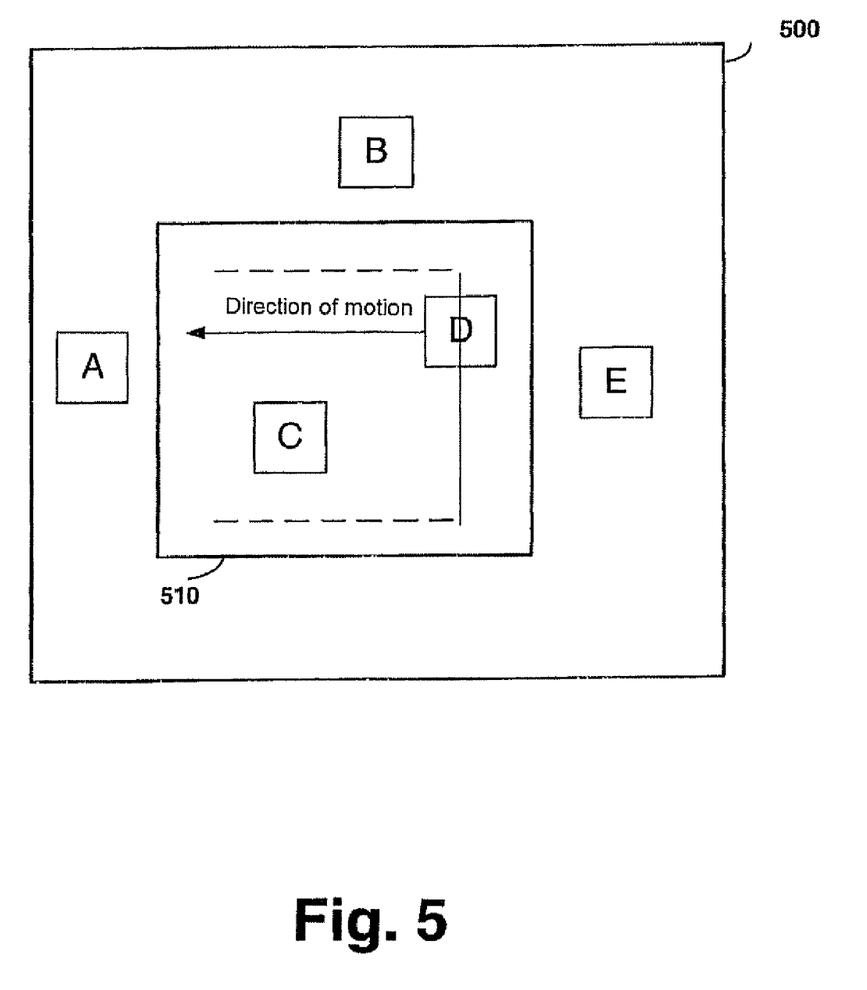
FIG. 5 shows another illustrative layout of elements on a web page used to assist in describing an exemplary implementation of the present invention.

In another illustrative implementation of the present invention shown in FIG. 5, the navigation region can be more limited than the navigation region described with respect to FIG. 4. An illustrative navigation sequence will be described with reference to FIG. 5 which shows five elements, A, B, C, D and E, a web page 500 and a display 510. The display 510 corresponds to the available display area associated with a computing device, such as a handheld device. In the example of FIG. 5, element D is the current focus element and the direction of motion is left as shown. After the computing device receives a left navigation command or input, the navigation algorithm determines whether any elements are located in a navigation region corresponding to the navigation direction. In FIG. 5, the navigation region has vertical limits, upper and lower boundaries defined by the dashed lines inside the display 510 and a right boundary defined by the direction of motion represented by the dotted line. More specifically, a line that intersects the midpoint of the current focus element and is perpendicular to the navigation direction defines the dotted line, and lines parallel to the navigation direction and spaced from a line intersecting the midpoint of the current focus element in the navigation direction define the dashed lines.

Having vertical limits in the case of horizontal motion and horizontal limits in the case of vertical motion within the display, can help to allow the user to see which elements can be navigated to prior to actually navigating to a particular element.

The elements in FIG. 5, which fall within the navigation region, include elements C and A. Since element C is radially closer to element D than element A, the algorithm sets element C as the next current focus element. In a further modification of the FIG. 5 implementation, the navigation region may have a left boundary other than the edge of the web page 500. In this implementation (not shown), the left boundary may be a line perpendicular to the navigation direction and spaced a prescribed distance from the midpoint of the current focus element in the navigation direction. In this implementation, the left boundary may not extend beyond the left edge of the page, regardless if the prescribed distance extends the boundary outside the page. When using a four-way d-pad, the boundaries of the navigation region form a rectangular window. As a result, with the window sized smaller than the display, the user may be able to see which element will be navigated to responsive to a navigation command in any of the four directions.

In one implementation that may be more intuitive to the user, the left boundary and the upper and lower boundaries remain within the confines of the display 510. Thus, the user can see the next element that will become the current focus element prior to that element becoming the current focus element. In this instance the boundaries may be set to correspond to a fixed portion of the display, or the whole display. The size of the navigation region including the location of the boundaries may be user-controllable, such that the system may have default boundaries, which can be changed by an individual user to suit his or her desire. Also, in one implementation, content displayed outside the navigation region on the display in a particular direction will be part of the content displayed responsive to a navigation command in that particular direction.

In another implementation, the size of the navigation region may be a function of the content. In this instance, the computing device may recognize a particular content format such as a content font, content size, content style or another format. Based on the format detected, the computing device can configure the navigation region. Also, the size of the navigation region may be set not to exceed the dimensions of the display or can be sized to not encompass content outside of what is shown on the display 510. This may be particularly useful if the user changes the amount of content displayed on the screen, for example between four and eight lines of content. The amount of content presented on the screen may be user-controllable.

It will be appreciated that the illustrative implementation described in FIG. 5 applies to other implementations such that the boundary in the direction of motion as well as the other two boundaries (in the upper or lower directions or left and right directions depending on the direction of motion) can be within the display. Having vertical limits in the case of horizontal motion and horizontal limits in the case of vertical motion to define the navigation region makes navigation between elements potentially more intuitive and less confusing to the user.

Figure 6:
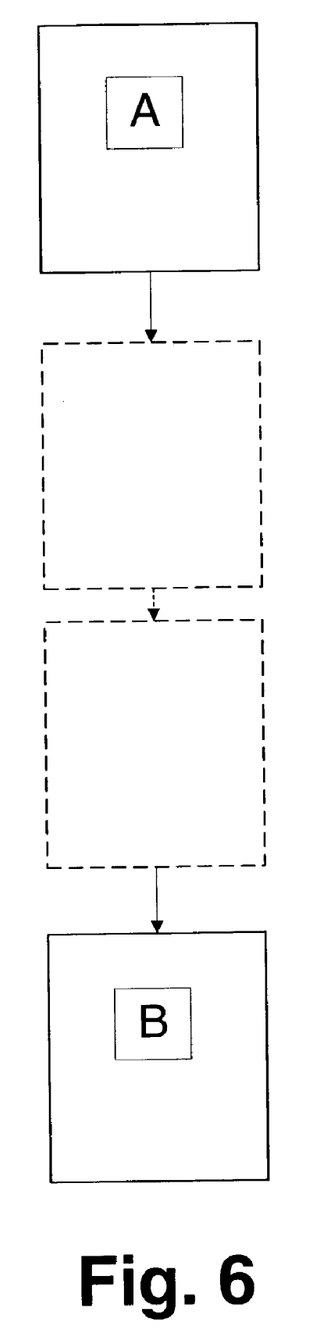
FIG. 6 shows a sequence of portions of content displayed as a user navigates between elements on a web page according to an exemplary implementation of the present invention.

In another implementation of the invention, neither the current focus element nor the closest element to the current focus element needs to be displayed on the display prior to or in response to an individual navigation command. FIG. 6 shows an illustrative sequence of portions of content displayed on the display responsive to successive navigation commands as a user navigates between elements on a web page. Initially displayed on the display is element A, which is the current focus element. Assume for purposes of this discussion that the left and right boundaries of the navigation region are defined to be at the outer edges of the right and left portions of the display and the downward boundary is the bottom of the display such that no candidate element for focus is present within the initial display region. Responsive to a first down navigation command, a display with content including no elements is shown. Hence, the current focus element is still element A, although the current focus element is no longer displayed on the display. Responsive to a second down navigation command, the display changes and again displays content including no elements with element A remaining as the current focus element. The upper, lower, left and right boundaries of the navigation region continue to be defined by the region shown in the display. In response to a further down navigation command, the system displays element B and finds that element B is within the navigation region. Then, the algorithm sets element B as the next current focus element. From this rudimentary example, it will be appreciated that the current focus element is not always displayed on the display when receiving the navigation command, for example when receiving the second down navigation command as described with respect to FIG. 6. In the example just described, if the user navigated left or right, for example following the first or second down navigation commands and one or more elements were found in the region displayed on the display, then an element displayed would be assigned as the current focus element.

Figure 7:
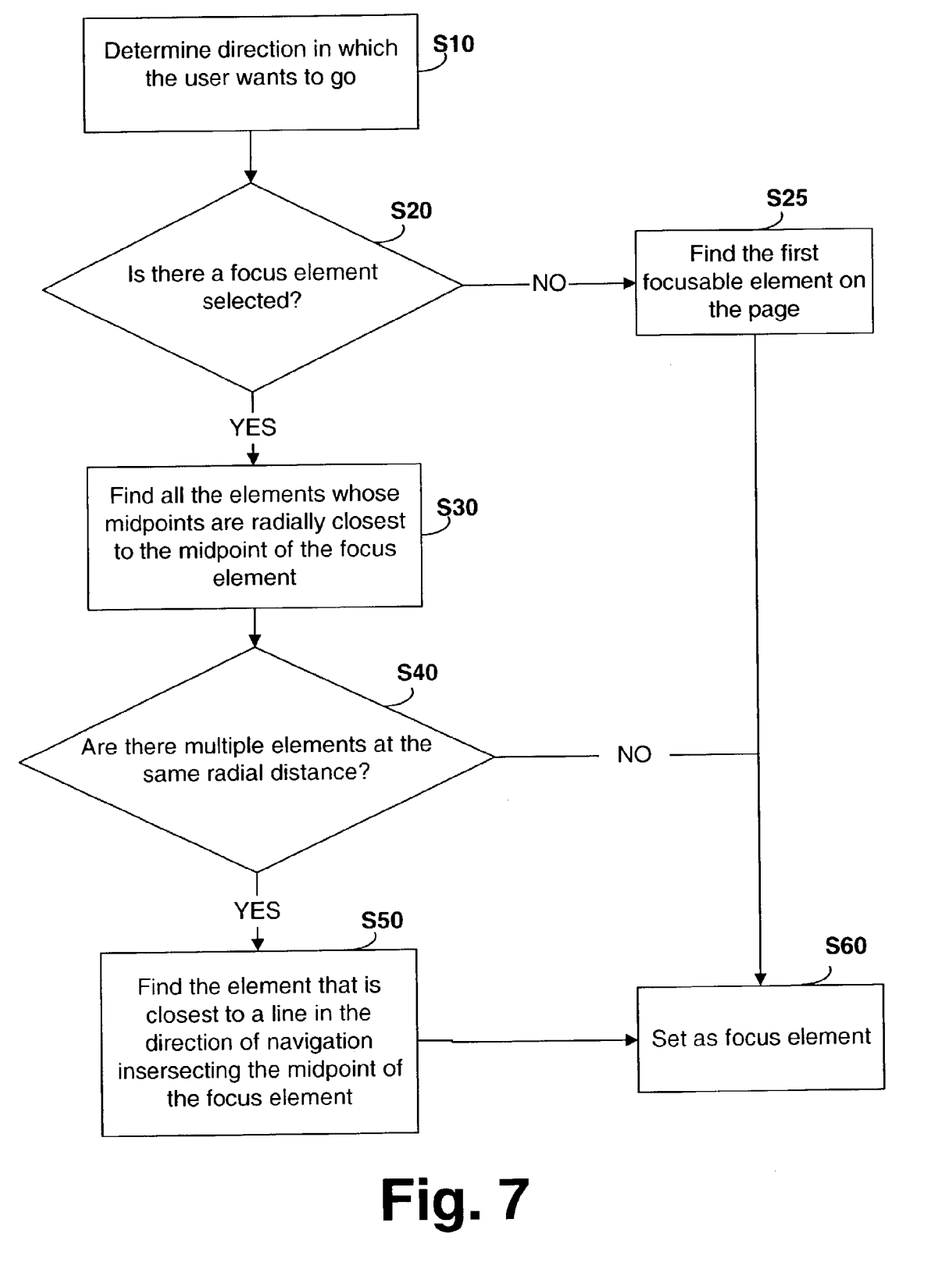
FIG. 7 shows a flowchart illustrating the steps to navigate between elements on a web page according to an exemplary implementation of the present invention.

FIG. 7 shows an illustrative method for implementing navigation between elements according to the present invention. In step S10, the algorithm determines which direction the user intends to navigate in by receiving the navigation command. Next, step S20 determines which, if any, element is the current focus element. When a current focus element exists (yes in step S20), in step S30 the method identifies every element that has a midpoint radially closest to the midpoint of the current focus element. Next, the method in step S40 determines whether more than one element is at the same radial distance from the current focus element. If at least two elements are the same radial distance from the current focus element (yes in step S40), then the method determines in step S50 which element is closest to a line in the direction of navigation intersecting the midpoint of the current focus element. Finally, in step S60 the element determined to be closest to the line in the direction of navigation in step S50 is set as the next current focus element. If only one element is identified as being radially closest to the current focus element in step S30 (no in step S40), then that element is set as the next current focus element in step S60. In the event that no element is the current focus element (no in step S20), such as can occur when the first portion of web page content displayed contains no elements, nothing occurs until an element is found in step S25. In this instance, responsive to a navigation command, the user navigates to another portion of the web page, either to the right or down depending on the command. The system finds a focusable element by searching on a displayed portion of the web page left to right, line by line (responsive to one or more navigation commands) until an element is found. If no element is found responsive to the first navigation command, this process will repeat responsive to successive commands until a displayed element is found. In step S60, that first element displayed is set as the current focus element.

Various examples of the present invention have been described above, and it will be understood by those of ordinary skill that the present invention includes within its scope all combinations and subcombinations of these examples. Additionally, those skilled in the art will recognize that the above examples simply exemplify the invention. Various changes and modifications may be made without departing from the spirit and scope of the invention, as defined in the appended claims.

The invention claimed is:

1. A method for navigating among elements on a page of content using a handheld computing device including a display, a portion of the content being presented on the display, said method comprising the steps of:
receiving an input corresponding to a navigation direction;
determining an element that is radially closest to a current focus element in the navigation direction including identifying all elements in a displayed region corresponding to the navigation direction and determining a radial distance between a midpoint of each element in the region corresponding to the navigation direction and a midpoint of the current focus element; and
setting the element as the next current focus element,
wherein the size of the displayed region is controlled by a user;
maintaining the current focus element and not displaying the current focus element on the display when receiving the navigation input if no elements are located in the displayed navigation region corresponding to the navigation direction.

2. The method according to claim 1, wherein when plural elements are radially closest to the current focus element, said determining includes determining which element of the plural elements is closest to a line intersecting the current focus element in the navigation direction.

3. The method according to claim 2, wherein the line intersects a midpoint of the current focus element.

4. The method according to claim 1, wherein the input is from a directional pad.

5. The method according to claim 4, wherein the directional pad is a four-way directional pad.

6. The method according to claim 1, wherein the page of content is from a browser application.

7. The method according to claim 1, wherein the page of content is from a word processing application or an email application.

8. The method according to claim 1, further including the step of modifying the content presented on the display responsive to the input.

9. The method according to claim 8, wherein the modified content presented on the display includes the next current focus element.

10. A computer storage medium having computer-executable instructions for performing the steps recited in claim 1.

11. A method for navigating among elements of a page of content using a handheld computing device including a display and a directional pad, said method comprising the steps of:
receiving a directional pad navigation input corresponding to a navigation direction;
identifying an element tat is radially closest to a midpoint of a current focus element in the navigation direction including comparing radial distances between the midpoint of the current focus element and a midpoint of any element within a displayed navigation region to determine which element is radially closest to the midpoint of the current focus element; and
setting the element identified as the next current focus element, wherein the size of the displayed navigation region is a function of the content;

maintaining the current focus element and not displaying the current focus element on the display when receiving the directional pad navigation input if no elements are located in the navigation region corresponding to the navigation direction.

12. The method according to claim 11, wherein when said comparing determines that at least two elements are radially equidistant from and closest to the midpoint of the current focus element, determining which element of the at least two elements is closest to a line intersecting the midpoint of the current focus element in the navigation direction.

13. The method according to claim 11, wherein the navigation region is defined according to the navigation direction.

14. The method according to claim 13, wherein the navigation region is bounded by a line intersecting the midpoint of the current focus element and perpendicular to the navigation direction, and second and third lines parallel to the navigation direction and spaced from a line intersecting the midpoint of the current focus element in the navigation direction.

15. The method according to claim 11, wherein the page of content is from a browser application.

16. The method according to claim 11, wherein the page of content is from a word processing application or an email application.

17. The method according to claim 11, wherein the directional pad is a four-way directional pad.

18. The method according to claim 11, wherein the handheld computing device includes a mobile phone.

19. A computer storage medium having computer-executable instructions for performing the steps recited in claim 11.

20. A method for navigating among elements of a page of content using a handheld computing device including a display and an input device, said method comprising the steps of:

receiving a navigation input corresponding to a navigation direction; and determining whether any elements are located in a navigation region corresponding to the navigation direction;

wherein if at least one element is located in the navigation region corresponding to the navigation direction, identifying an element that is radially closest to a midpoint of a current focus element in the navigation direction, and setting the element identified as radially closest to the midpoint of the current focus element as the next current focus element;

maintaining the current focus element and not displaying the current focus element on the display when receiving the navigation input if no elements are located in the navigation region corresponding to the navigation direction, and setting vertical limits in case of horizontal motion and horizontal limits in case of a vertical motion within the display.

21. The method according to claim 20, displaying different content on the display responsive to receiving the navigation input.

22. The method according to claim 21, wherein the different content presented on the display responsive to the navigation input excludes the current focus element.

23. The method according to claim 21, wherein the different content presented on the display responsive to the navigation input includes an element different from the current focus element.

24. The method according to claim 21, wherein the different content presented on the display responsive to the navigation input includes the next current focus element.

25. The method according to claim 21, wherein the next current focus element is displayed on the display when receiving the navigation input.

26. The method according to claim 20, wherein the input is from a directional pad.

27. The method according to claim 26, wherein the directional pad is a four-way directional pad.

28. A computer storage medium having computer-executable instructions for preforming the steps recited in claim 20.

* * * * *